(12) United States Patent
Zeng et al.

(10) Patent No.: US 12,347,981 B1
(45) Date of Patent: Jul. 1, 2025

(54) MULTIFUNCTIONAL ACCESSORY STORAGE STRUCTURE FOR POWER CONVERTER

(71) Applicants: Guangli Zeng, Guangdong (CN); Sitian Wang, Guangdong (CN)

(72) Inventors: Guangli Zeng, Guangdong (CN); Sitian Wang, Guangdong (CN)

( * ) Notice: Subject to any disclaimer, the term of this patent is extended or adjusted under 35 U.S.C. 154(b) by 0 days.

(21) Appl. No.: 18/798,936

(22) Filed: Aug. 9, 2024

(30) Foreign Application Priority Data

Dec. 26, 2023 (CN) .......................... 202323581326.1
Feb. 1, 2024 (CN) .......................... 202410149629.6

(51) Int. Cl.
| | |
|---|---|
| *H01R 13/72* | (2006.01) |
| *H01R 31/06* | (2006.01) |
| *H02G 3/08* | (2006.01) |
| *A45C 11/18* | (2006.01) |

(52) U.S. Cl.
CPC ........... *H01R 13/72* (2013.01); *H01R 31/065* (2013.01); *H02G 3/08* (2013.01); *A45C 2011/188* (2013.01)

(58) Field of Classification Search
CPC ......... H02G 3/08; H02G 3/081; H01R 13/72; H01R 31/065; H01R 13/73; A45C 2011/188; H05K 5/00; H05K 5/02
USPC ..... 174/50, 520, 66, 559; 220/3.2–3.8, 4.02; 361/600, 601, 641, 679.01, 679.55, 724; 439/535, 536, 638
See application file for complete search history.

(56) References Cited

U.S. PATENT DOCUMENTS

| | | | | |
|---|---|---|---|---|
| 7,025,627 | B2* | 4/2006 | Rosenthal | H01R 13/72 439/142 |
| 7,304,852 | B2* | 12/2007 | Hernandez | H05K 7/20409 174/50 |
| 7,713,073 | B2* | 5/2010 | Lin | H01R 13/72 439/131 |
| 7,817,405 | B2* | 10/2010 | Neumann | H02B 1/52 174/57 |
| 7,826,220 | B1* | 11/2010 | Baker | F41C 33/06 340/5.2 |
| 8,936,489 | B2* | 1/2015 | Liao | H01R 31/06 439/638 |
| 8,964,368 | B2* | 2/2015 | Looney | H04Q 1/06 174/67 |
| 8,981,220 | B2* | 3/2015 | Fargano | H01R 43/18 174/59 |
| 11,600,998 | B2* | 3/2023 | Walker | H02J 7/0044 |

* cited by examiner

*Primary Examiner* — Angel R Estrada

(57) ABSTRACT

The invention discloses a multifunctional accessory accommodating structure for a power converter, A data line, a data line adapter, a SIM phone card and a phone card thimble can be accommodated on the side of the power converter, and each of them can be separately accommodated on the side of the power converter for use, and can also be freely combined, placed and taken for use. The data cable, the data cable adapter, the SIM phone card and the phone card thimble are accommodated at the side of the power converter, so that people can carry things conveniently, do not need to occupy extra space, are convenient to travel and use, and improve the practicability of the power converter.

6 Claims, 6 Drawing Sheets

MULTIFUNCTIONAL ACCESSORY STORAGE STRUCTURE FOR POWER CONVERTER

CROSS-REFERENCE TO RELATED APPLICATIONS

This application claims priority benefits to Chinese Patent Applications No. 2023235813261, filed on Dec. 26, 2023, and No. 2024101496296, filed on Feb. 1, 2024, the contents of which are incorporated herein by reference.

TECHNICAL FIELD

The invention relates to the technical field of power converters, in particular to a multifunctional accessory storage structure for power converters.

BACKGROUND

Because the specifications of plugs and sockets in different countries are different, they can't be used universally. If you need to insert the plugs into sockets with mismatched specifications, you need to go through a power converter. The power converter is a switching tool. When in use, the power converter is inserted into the target socket, and then the target plug is inserted into the matching socket hole on the power converter to realize the conversion. The appearance of power converter improves the convenience of people's life outside, especially when they travel internationally, so there is no need to worry about the trouble caused by the mismatch between the plug of the electronic equipment they carry and the local power socket.

In addition, people often have to change their calling cards and mobile phone charging cable connectors when traveling abroad or working, but it takes different tools to change their calling cards and mobile phone charging cable connectors, which easily leads to inconvenience and is not conducive to travel.

SUMMARY OF THE INVENTION

In view of the above shortcomings, the purpose of the present invention is to provide a multifunctional accessory storage structure for a power converter, in which a data cable, a data cable adapter, a SIM phone card and a phone card thimble can be stored on the side of the power converter, and each of them can be stored separately and taken out for use, or can be freely combined and stored on the side of the power converter for common use. The data cable, the data cable adapter, the SIM phone card and the phone card thimble are accommodated at the side of the power converter, so that people can carry things conveniently, do not need to occupy extra space, are convenient to travel and use, and improve the practicability of the power converter.

The technical scheme adopted by the invention for achieving the above purpose is as follows:

A multifunctional accessory accommodating structure for a power converter comprises a placing groove formed on the side of the power converter and a functional component, wherein the functional component comprises any one or a combination of the following: a data cable, a data adapter, a SIM phone card, a phone card thimble.

As a further improvement of the invention, it also includes an I-upper cover whose I-end is clamped with the side edge of the power converter and can be covered on the placing groove; The functional component is installed between the placing groove and the upper cover.

As a further improvement of the invention, the data line comprises an I-wire body and a connector respectively connected to two ends of the wire body; The placing groove is internally provided with a data line placing groove which has a U shape as a whole and is used for placing the data line, The data line placing groove comprises an I-wire body placing groove which is U-shaped as a whole and used for placing wires, and I-joint placing grooves which are respectively arranged at two ends of the wire body placing groove and used for placing connectors; At least a connector clamping lugs protruding into the connector insertion groove are symmetrically formed on the side edges of the connector insertion groove respectively.

As a further improvement of the invention, the data line comprises an I-wire body and a connector respectively connected to two ends of the wire body; The upper cover is formed with an I-data line placing groove which is U-shaped as a whole and is used for placing the data line, and the data line placing groove comprises an I-line body placing groove which is U-shaped as a whole and used for placing a line body, and I-joint placing grooves which are respectively arranged at two ends of the line body placing groove and used for placing a connector; At least one I-joint clamping lug protruding into the joint insertion groove is formed on the side edge of the joint insertion groove.

As a further improvement of the invention, a adapter insertion slot for inserting the data adapter is formed in the placement slot, and at least a adapter clamping lugs protruding into the adapter insertion slot are formed on the side of the adapter insertion slot.

As a further improvement of the invention, a adapter insertion slot for inserting the data adapter is formed on the upper cover, and at least a adapter clamping lugs protruding into the adapter insertion slot are formed on the side of the adapter insertion slot.

As a further improvement of the invention, an I-phone card placing slot for placing the SIM phone card is formed in the placing slot, and at least I-phone card fixing blocks protruding into the phone card placing slot are symmetrically formed on the side edges of the phone card placing slot.

As a further improvement of the invention, the upper cover is formed with a phone card insertion slot for inserting the SIM phone card, and at least a phone card fixing blocks protruding into the phone card insertion slot are symmetrically formed on the side edges of the phone card insertion slot.

As a further improvement of the invention, an I-thimble insertion groove for inserting the thimble of the telephone card is formed on the inner side of the upper cover, and at least I-thimble fixing blocks protruding towards the inside of the thimble insertion groove are symmetrically arranged on the side edges of the thimble insertion groove respectively.

As a further improvement of the invention, a thimble insertion groove for inserting the thimble of the telephone card is formed in the placement groove, and at least a thimble fixing blocks protruding towards the inside of the thimble insertion groove are symmetrically arranged on the side edges of the thimble insertion groove.

As a further improvement of the present invention, the other end of the upper cover is formed with an outward extending I-cover clamping block, and at least one I-cover clamping groove for clamping the cover clamping block is formed on the side of the placing groove.

The invention has the beneficial effects that:

By arranging the storage structure to include a placing groove formed on the side of the power converter, a upper cover with a end hinged on the side of the power converter and capable of covering the placing groove, and a functional component; By including the functional components in any one or combination of the following: a data cable, a data adapter, a SIM phone card, a phone card thimble, data cable can be used to connect mobile phone and computer, mobile phone and charging treasure, etc., so as to avoid people from carrying extra data cable when traveling, reserve extra space for placing data cable, and avoid the trouble of data cable winding on other items. The data line adapter can be installed on the data line, which is convenient for different interface conversion. The SIM phone card can be a replaced domestic phone card or a foreign phone card to be replaced, thus facilitating telephone communication when people travel. The phone card thimble is used for ejecting the phone card from the mobile phone, which is convenient for people to replace the phone card when traveling. Each of them can be separately stored on the side of the power converter and taken out for use, or can be freely combined and stored on the side of the power converter and taken out together for use. By storing the data cable, the data cable adapter, the SIM phone card and the phone card thimble at the side of the power converter, the data cable can be used at the same time as the power converter, which does not need to occupy extra space, is convenient for traveling, and improves the practicability of the power converter.

The above is an overview of the technical scheme of the invention, and the invention will be further explained with the attached drawings and specific embodiments.

Figure 1:
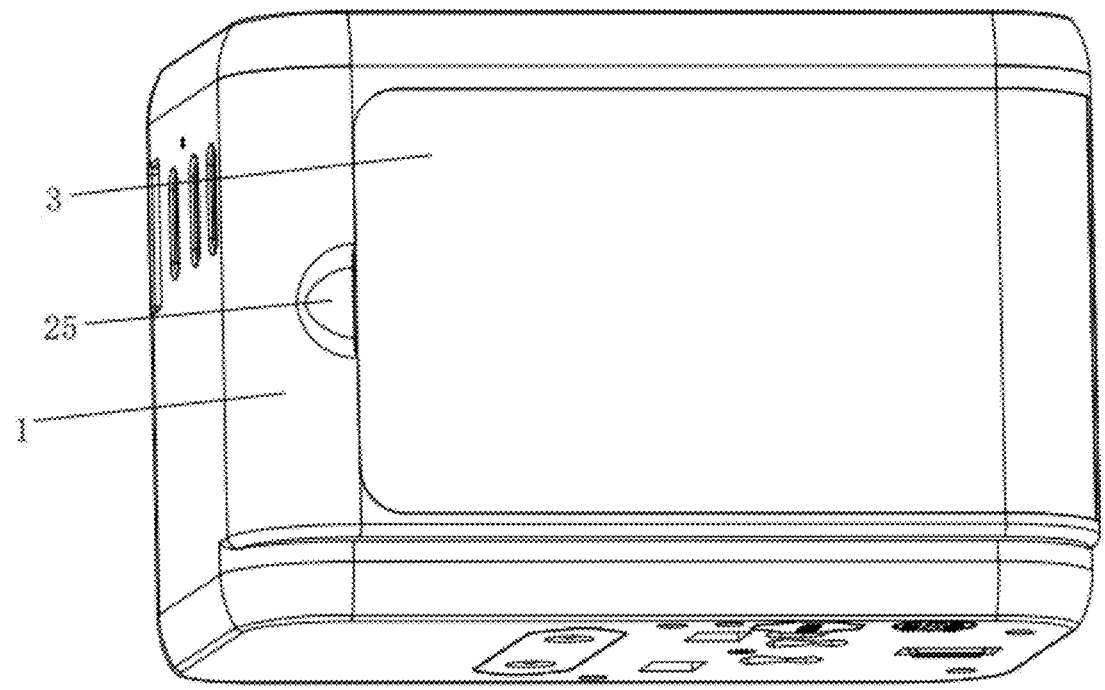
FIG. 1 is an overall schematic diagram of the present invention.

In the picture: 1. Power converter; 2. Placement slot; 21. The data line is placed in the slot; 211. The thread body is placed in the groove; 212. Joint insertion groove; 2121. The joint is clamped with convex strips; 22. The adapter is placed in the groove; 221. TYPE-C mother seat placement slot; 222. The USB male head is placed in the slot; 2221. The adapter is clamped with the convex strip; 23. Telephone card placement slot; 231. Telephone card fixing block; 24. Cover body clamping groove; 25. Open the yielding slot; 26. The thimble is placed in the groove; 261. Thimble fixing block; 3. Upper cover; 31. The thimble is placed in the groove; 311. Thimble fixing block; 32. The cov body clamping block; 321. Guide inclined surface; 33. The data line is placed in the slot; 331. The thread body is placed in the groove; 332. Joint insertion groove; 3321. The joint is clamped with convex strips; 34. The adapter is placed in the groove; 341. TYPE-C mother seat placement slot; 342. The USB male head is placed in the slot; 3421. The adapter is clamped with the convex strip; 35. Telephone card placement slot; 351. Telephone card fixing block; 4. Functional components; 41. Data line; 411. Line body; 412. Joint; 42. Data adapter; 421. TYPE-C female connector; 422. USB male head; 43. SIM calling card; 44. Telephone card thimble

EMBODIMENTS

In order to further illustrate the technical means and effects adopted by the present invention to achieve the predetermined purpose, the specific embodiments of the present invention will be described in detail with the attached drawings and preferred embodiments.

In the description of the present invention, it should be understood that the terms length, width, top, bottom, front, back, left, right, vertical, horizontal, top, bottom, inside and outside. It is only for the convenience of describing the present invention and simplifying the description, and does not indicate or imply that the referred devices or elements must have a specific orientation, be constructed and operated in a specific orientation, so it cannot be understood as limiting the present invention.

In addition, the terms "first" and "second" are only used for descriptive purposes, and cannot be understood as indicating or implying relative importance or implicitly indicating the number of indicated technical features. Therefore, the features defined as "first" and "second" may include one or more of these features explicitly or implicitly. In the description of the present invention, "plural" means two or more, unless otherwise specifically defined.

In the present invention, unless otherwise specified and limited, the terms "installation", "connection", "connection" and "fixation" should be broadly understood, for example, they can be fixed connection, detachable connection or integrated; It can be a mechanical connection or an electrical connection; Can be directly connected, can also be indirectly connected through an intermediary, can be the internal connection of two elements or the interaction between two elements. For those skilled in the art, the specific meanings of the above terms in the present invention can be understood according to specific situations.

Referring to FIGS. 1 to 10, an embodiment of the present invention provides a multifunctional accessory storage structure for a power converter 1. Comprises a placing groove 2 formed on the side of a power converter 1, the a end is hinged on the side of the power converter 1 and can cover the a upper cover 3 on the placing slot 2. a function assembly 4 installed between the placing slot 2 and the upper cover 3, and the function assembly 4 includes any one or combination of the following: a data line 41, a data adapter 42, a SIM phone card 43 and a phone card thimble 44.

By arranging the storage structure as including a placing groove 2 formed on the side of the power converter 1, an upper cover 3 with one end hinged on the side of the power converter 1 and capable of covering the placing groove 2, a functional component 4 installed between the placing slot 2 and the upper cover 3, and the upper cover 3 covers the placing slot 2, so as to prevent the functional accessories in the placing slot 2 from falling out and achieve the purpose of storage. The covering mode is also convenient for people to take the functional accessories in the placing slot 2, which is convenient for use. By including the functional component 4 in any one or a combination of the following: a data line 41, a data adapter 42, a SIM phone card 43, a phone card thimble 44, data line 41 can be used to connect mobile phone and computer, mobile phone and charging treasure, etc. People are not required to carry the data cable 41 extra when traveling, so extra space is reserved for placing the data cable 41, and the trouble that the data cable 41 is wound on other articles is also avoided. The data line adapter 42 can be installed on the data line 41 to facilitate the conversion of different interfaces. The SIM phone card 43 can be a replaced domestic phone card or a foreign phone card to be replaced, so as to facilitate telephone communication when people travel. The calling card thimble 44 is used to eject the calling card from the mobile phone, which is convenient for people to replace the calling card when traveling. Each of them can be separately stored on the side of the power converter 1 and taken out for use, or can be freely combined and stored on the side of the power converter 1 and taken out together for use. By aligning the data lines at the side of the power converter 1 41. Data line adapter 42. SIM calling card 43. The telephone card thimble 44 can be stored, and the data line 41 can be used at the same time as the power converter 1, which does not need to occupy extra space, is convenient for traveling, and improves the practicability of the power converter 1. The functional component 4 can be installed in the placing slot 2 horizontally or embedded in the placing slot 2 vertically, and it can be set according to the actual situation, so it is not specifically limited in this embodiment.

In order to prevent the functional component 4 from falling from the placing slot 2, as shown in FIGS. 1 to 6 and 9 to 10, it further comprises an I-upper cover 3, the I-end of which is clamped with the side of the power converter and can be covered on the placing slot 2; The functional assembly 4 is installed between the placing slot 2 and the upper cover 3, and the upper cover 3 covers the placing slot 2, so as to prevent the functional accessories in the placing slot 2 from falling out and achieve the purpose of storage. The covering mode is also convenient for people to take the functional accessories on the placing slot 2 and is convenient for use.

Figure 2:
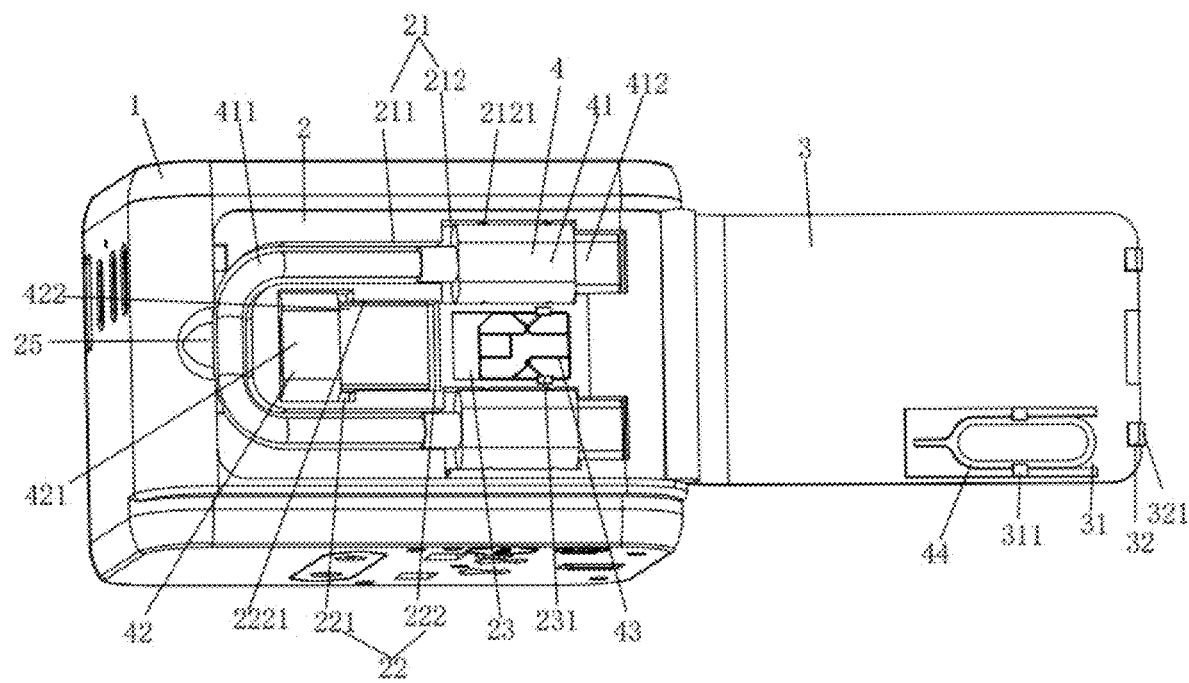
FIG. 2 is a schematic structural view when the upper cover is opened.
Figure 3:
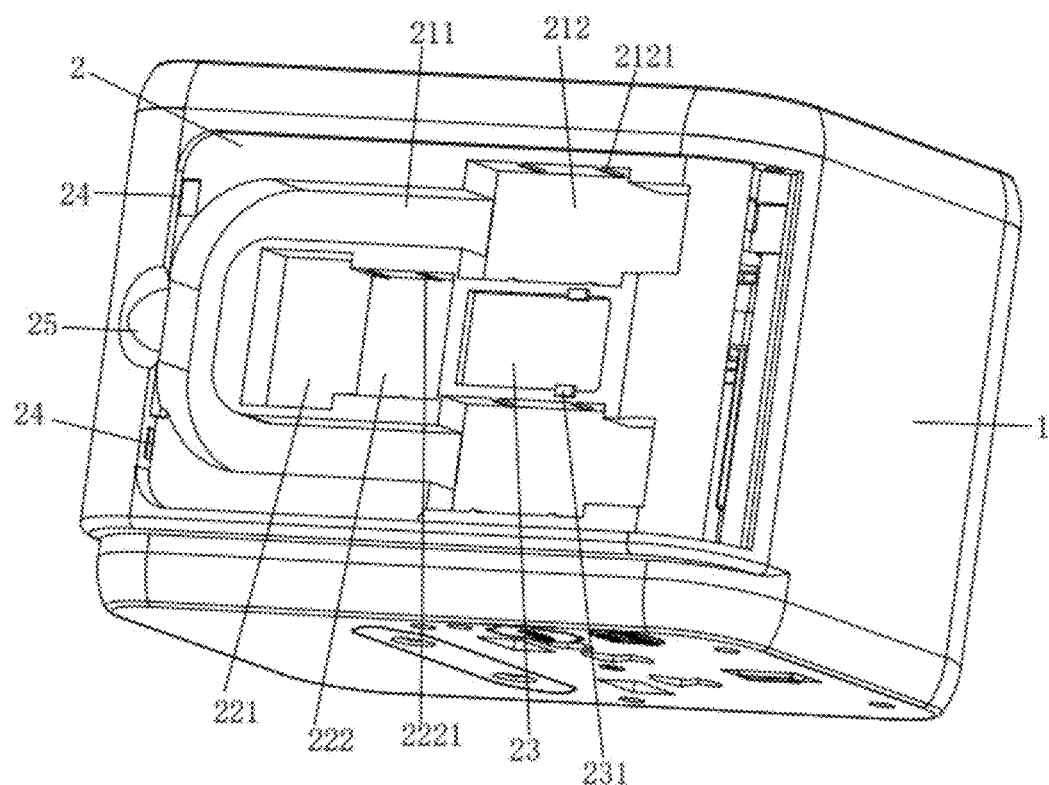
FIG. 3 is a schematic structural view of the present invention with the upper cover and functional components removed.

As for the specific storage mode of the data line 41, as shown in FIGS. 2 and 3, the data line 41 includes a line body 411 and a connector 412 respectively connected to both ends of the line body 411; A U-shaped a data line placing groove 21 for placing the data line 41 is formed in the placing groove 2. The data line insertion slot 21 includes an I-wire insertion slot 211 which is U-shaped as a whole and is used for placing the wire 411, and I-connector insertion slots 212 which are respectively arranged at both ends of the wire insertion slot 211 and are used for placing the connectors 412. At least one I-joint clamping rib 2121 protruding into the joint insertion groove 212 is symmetrically formed on the side edges of the joint insertion groove 212. The wire body 411 is correspondingly placed in the wire body placing groove 211, and the connectors 412 are respectively placed in the connector placing grooves 212. And the side edge of the connector 412 is pressed against the connector clamping protrusion 2121, so that the connector 412 is fixed in the connector insertion groove 212, and the position of the data line 41 is fixed. The data line 41 is prevented from shifting and falling from the data line insertion groove 21, so as to achieve the purpose of accommodating the data line 41. When it is taken, it can be taken out as a whole only by pulling out the connector 412 from the connector clamping lug 2121, which is convenient for use. The wire insertion groove 211 is arranged in a U-shaped structure as a whole, which is favorable for bending and accommodating the data wire 41 and saving the space in the insertion groove 2.

Figure 5:
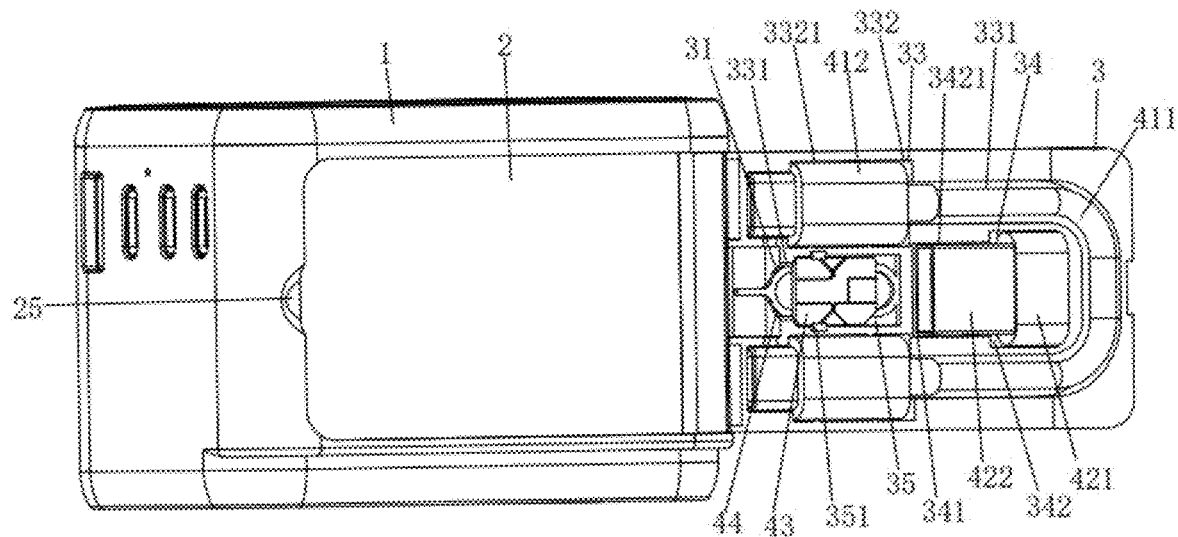
FIG. 5 is an overall schematic diagram of the functional component when it is on the upper cover.
Figure 6:
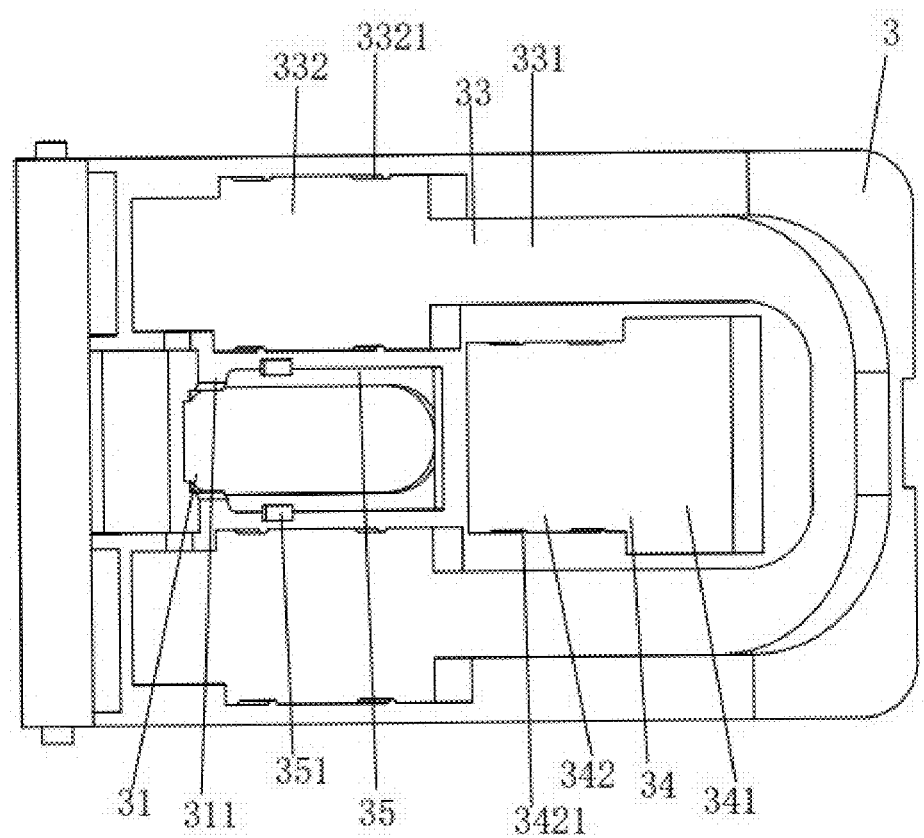
FIG. 6 is a schematic structural view of the upper cover when the functional components are on the upper cover.

The data line 41 can also be accommodated in the upper cover 3, as shown in FIGS. 5 and 6. Specifically, the upper cover 3 is formed with an I-data line accommodating groove 33 which is generally U-shaped and is used for accommodating the data line 41. The data line insertion slot 33 includes an I-wire insertion slot 331 which is generally U-shaped and used for placing the wire 411. And I-joint insertion grooves 332 respectively arranged at two ends of the insertion groove of the wire body 411 and used for placing the joint 412; At least an I-joint clamping rib 3321 protruding into the joint insertion groove 332 is formed on the side of the joint insertion groove 332, The wire body 411 is placed in the wire body placement slot 331, and the connector 412 is placed in the connector placement slot 332. Moreover, the side edge of the connector 412 abuts against the connector engaging rib 3321, thereby fixing the position of the data line 41 and preventing the data line 41 from shifting and falling from the insertion groove of the data line 41.

As for the specific storage mode of the data adapter 42, as shown in FIGS. 2 and 3, The data adapter 42 includes an I-TYPE-C female connector 421 and a USB male connector 422 connected to the TYPE-C female connector 421. A adapter insertion slot 22 for inserting the data adapter 42 is formed in the middle of the insertion slot 2 and between the two ends of the wire insertion slot 211. The adapter insertion slot 22 includes an I-TYPE-C female connector insertion slot 221 for placing the Type-C female connector 421 and an I-USB male connector insertion slot 222 for placing the USB male connector 422. At least I-adapter clamping lugs 2221 protruding into the USB male insertion groove 222 are symmetrically formed on the sides of the USB male insertion groove 222. The TYPE-C female connector 421 is used for inserting the data line connector 412 to be converted, The USB male connector 422 is used to be inserted into the target machine to complete the conversion of the connector 412. The TYPE-C female connector 421 is correspondingly inserted into the TYPE-C female insertion groove 221, The USB male head 422 is correspondingly placed in the USB male head placing groove 222, and the side edge of the USB male head 422 is pressed against the adapter clamping lug 2221. Therefore, the USB male connector 422 is fixed in the USB male connector insertion slot 222, and the position of the data adapter 42 is fixed. The USB male connector 422 is prevented from shifting and falling from the USB male connector insertion slot 22, and the purpose of accommodating the data adapter 42 is achieved. When it needs to be taken out, it is only necessary to pull out the USB male head 422 from the adapter clamping lug 2221, so that the data adapter 42 can be taken out as a whole, which is convenient for use.

The data adapter 42 can also be accommodated on the upper cover 3, as shown in FIGS. 5 and 6. A adapter insertion slot 34 for inserting the data adapter 42 is formed in the insertion slot 2. The adapter insertion slot 34 includes an I-TYPE-C female connector insertion slot 341 for placing the Type-C female connector 421 and an I-USB male connector insertion slot 342 for placing the USB male connector 422. At least I-adapter clamping lugs 3421 protruding into the USB male insertion slot 342 are symmetrically formed on the sides of the USB male insertion slot 342. The TYPE-C female connector 421 is correspondingly inserted into the TYPE-C female insertion groove 341, The USB pin 422 is correspondingly placed in the USB pin placement slot 342, And the side edge of the USB male head 422 is pressed against the adapter clamping lug 3421, Therefore, the USB male connector 422 is fixed in the USB male connector insertion slot 342, and the position of the data adapter 42 is fixed. The USB male connector 422 is prevented from shifting and falling from the USB male connector insertion slot 342, and the purpose of accommodating the data adapter 42 is achieved. When it needs to be taken out, it is only necessary to pull out the USB male head 342 from the adapter clamping lug 3421, so that the data adapter 42 can be taken out as a whole, which is convenient for use.

For the specific structural arrangement of the data adapter, the data adapter can also be an I-TYPE-C male connector and a USB female socket connected to the TYPE-C male connector. The adapter insertion slot comprises a TYPE-C male connector insertion slot for placing the TYPE-C male connector and a USB female socket insertion slot for placing the USB female socket. At least a adapter clamping lugs protruding into the USB socket insertion groove are symmetrically formed on the side edges of the USB socket insertion groove respectively. The TYPE-C male connector is correspondingly placed in the TYPE-C male connector placing groove, and the USB female socket is correspondingly placed in the USB female socket placing groove. And the side edge of the USB socket is pressed against the adapter clamping convex strip, so that the USB socket is fixed in the USB socket insertion groove and the position of the data adapter is fixed, The USB socket is prevented from shifting and falling from the USB socket insertion slot, so as to achieve the purpose of accommodating the data adapter. When it needs to be taken out, the data adapter can be taken out as a whole only by pulling out the USB socket from the adapter clamping lug, which is convenient to use.

The connector or socket of the data adapter can also be of any of the following structures: Micro-B structure, lightning (commonly known as apple mouth) structure, which can be set according to the actual situation.

In order to facilitate people to take the data adapter 42 out of the USB male slot 22, as shown in FIGS. 2 and 3, The length of the TYPE-C socket insertion groove 221 is longer than that of the TYPE-C socket connector 421, The length of the USB male insertion slot 222 is longer than that of the USB male insertion slot 422, so that enough space is reserved in the USB male insertion slot 22, which is convenient for people to take the data adapter 42 out of the USB male insertion slot 22 by hand or other articles from the reserved space, thus improving convenience.

As for the specific way that the SIM phone card 43 is accommodated in the accommodating slot 2, as shown in FIGS. 2 and 3, a phone card accommodating slot 23 for accommodating the SIM phone card 43 is formed in the middle of the accommodating slot 2 between two groups of connector accommodating slots 212. At least a phone card fixing blocks 231 protruding into the phone card placing groove 23 are symmetrically formed on the side edges of the phone card placing groove 23, The SIM phone card 43 is correspondingly inserted into the phone card insertion slot 23 and is resisted by the phone card fixing block 231 from the upper end. So as to prevent the SIM phone card 43 from shifting out of the phone card insertion slot 23 and achieve the purpose of accommodating the SIM phone card. When it needs to be taken out, it only needs to slide the SIM phone card 43 out of the phone card insertion slot 23, so that the SIM phone card 43 can be taken out as a whole, which is convenient for use.

The SIM phone card 43 can also be accommodated in the upper cover, as shown in FIGS. 5 and 6. Specifically, a phone card accommodating groove 35 for accommodating the SIM phone card 43 is formed in the upper cover 3, and at least a phone card fixing blocks 351 protruding into the phone card accommodating groove 35 are symmetrically formed on the sides of the phone card accommodating groove 35. The SIM phone card 43 is correspondingly inserted into the phone card insertion slot 35 and is resisted by the phone card fixing block 351 from the upper end. So as to prevent the SIM phone card 43 from shifting out of the phone card insertion slot 35 and achieve the purpose of accommodating the SIM phone card 43. When it needs to be taken out, it only needs to slide the SIM phone card 43 out of the phone card insertion slot 35, so that the SIM phone card 43 can be taken out as a whole, which is convenient for use.

In order to facilitate people to take out the SIM phone card 43 from the phone card insertion slot 23, as shown in FIGS. 2 and 3, The length of the phone card insertion slot 23 is longer than that of the phone card, so that enough space is reserved in the phone card insertion slot 23. It is convenient for people to take the SIM phone card 43 out of the phone card slot 23 by hand or other objects from the reserved space. Preferably, the phone card fixing block 231 is biased to one side of the phone card insertion slot 23, not in the middle of the phone card insertion slot 23. Therefore, the SIM phone card 43 can be accommodated in one side of the phone card insertion slot 23, and people can push out the SIM phone card 43 through the vacant side of the phone card insertion slot 23, thus improving the efficiency of taking out the SIM phone card 43.

Figure 4:
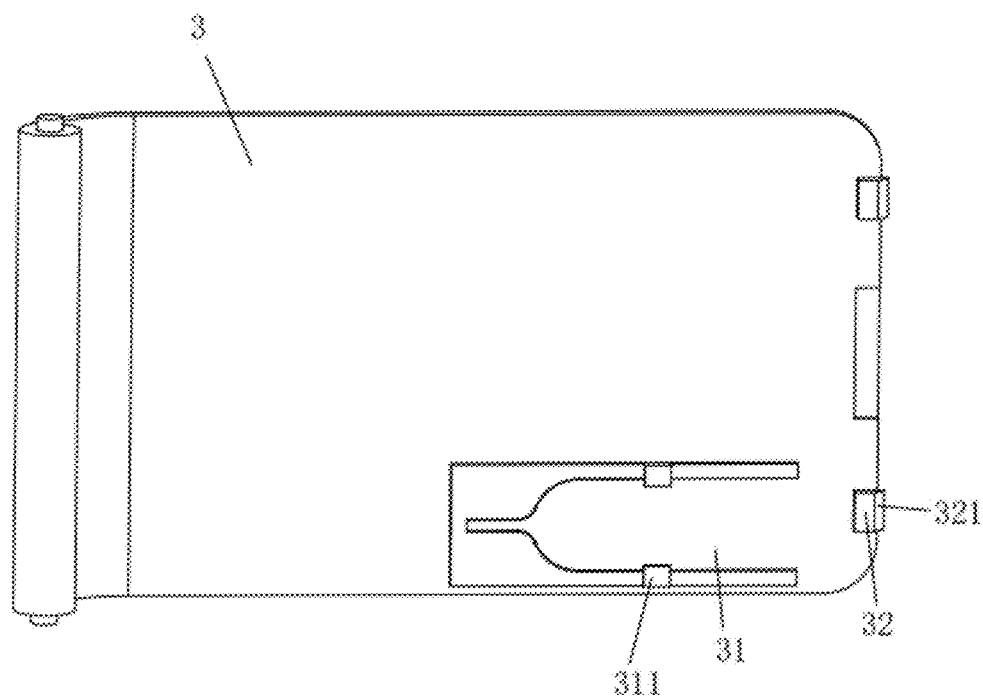
FIG. 4 is a schematic structural view of the upper cover.

As for the specific storage mode of the telephone card thimble 44, as shown in FIGS. 2 and 4, a thimble insertion groove 31 for inserting the telephone card thimble 44 is formed inside the upper cover 3. At least one ejector pin fixing block 311 protruding towards the inside of the ejector pin placing groove 31 is symmetrically arranged on the side edges of the ejector pin placing groove 31, The telephone card thimble 44 is correspondingly inserted into the thimble insertion groove 31 and is pressed upward by the thimble fixing block 311. So as to prevent the telephone card thimble 44 from shifting out of the thimble insertion groove 31 and achieve the purpose of accommodating the telephone card thimble 44. When you need to take it, you only need to slide the telephone card thimble 44 out of the thimble insertion slot 31, which is convenient for use.

Figure 7:
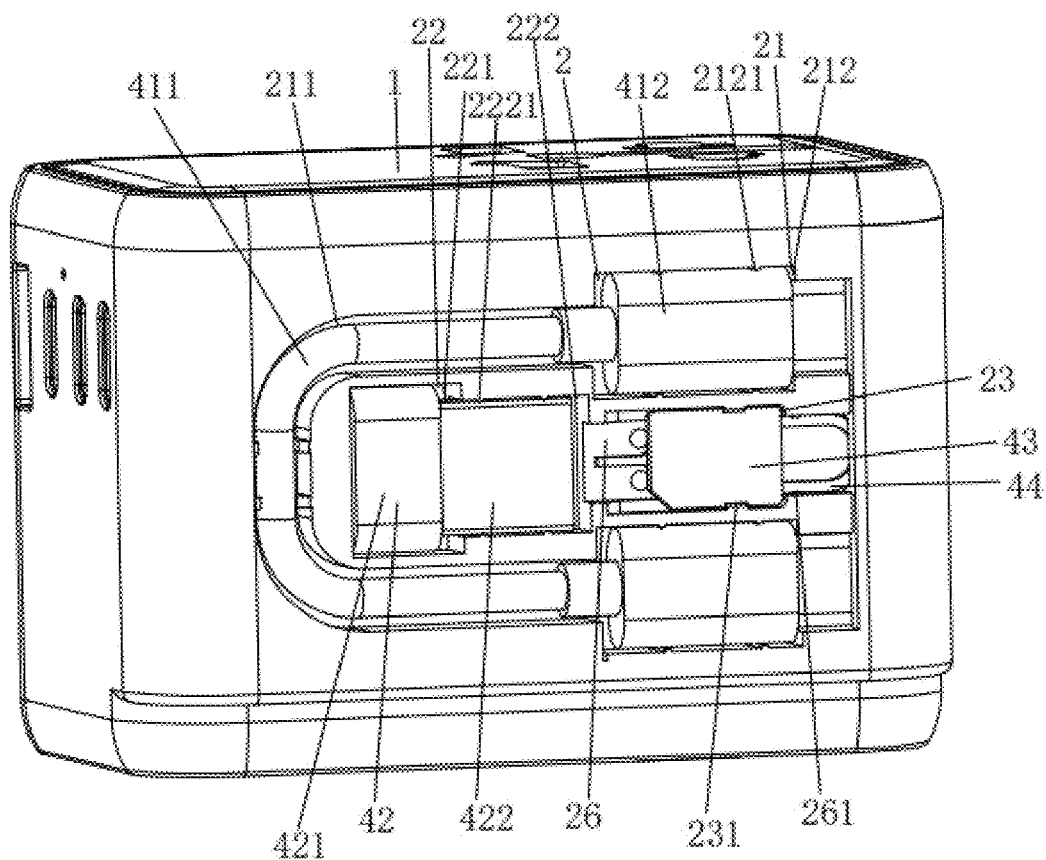
FIG. 7 is an overall schematic diagram when an upper cover is not needed.
Figure 8:
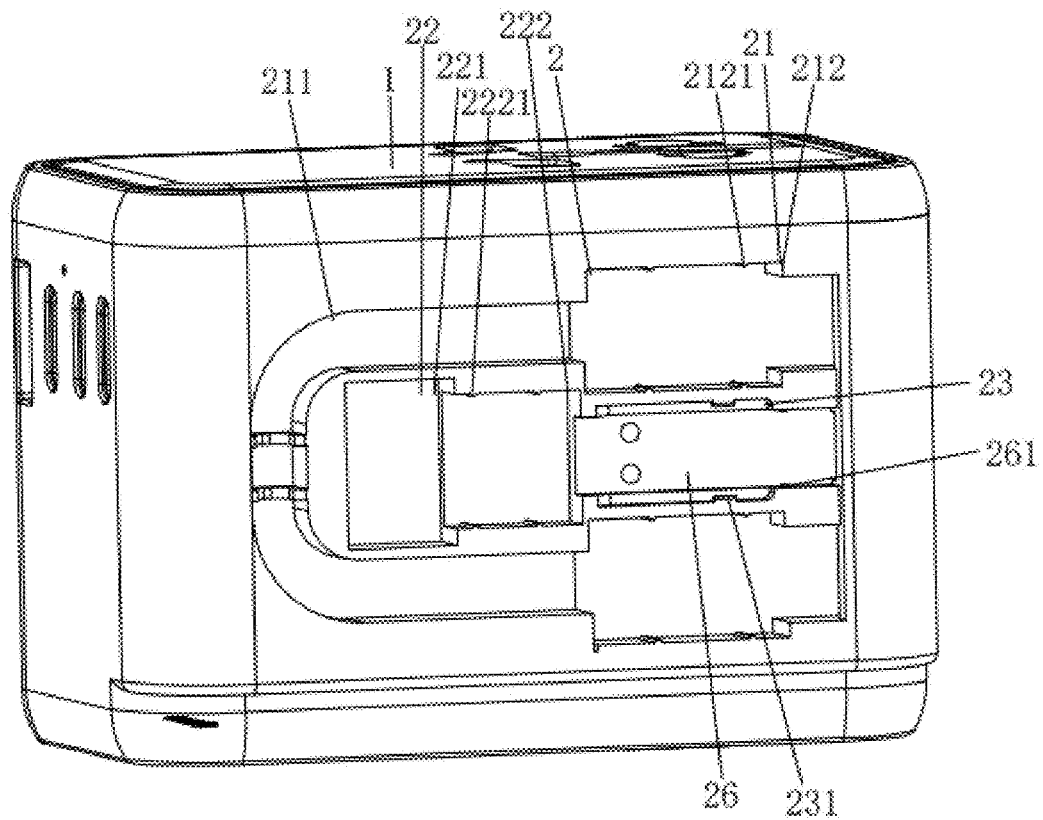
FIG. 8 is a schematic structural view of the de-functional assembly when the upper cover is not needed.
Figure 9:
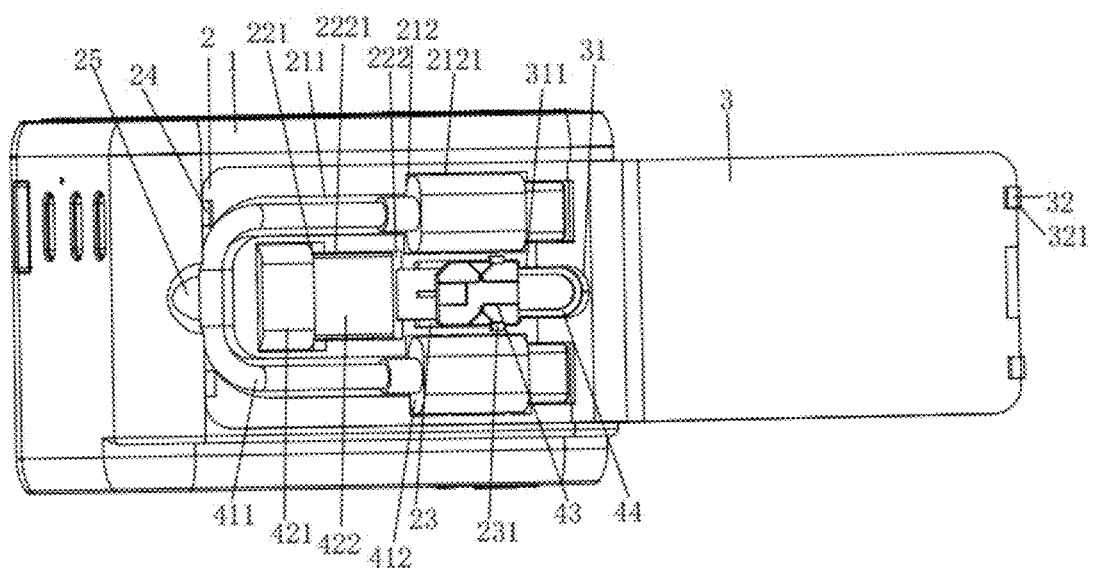
FIG. 9 is an overall schematic view of the ejector pin installed in the placing groove.
Figure 10:
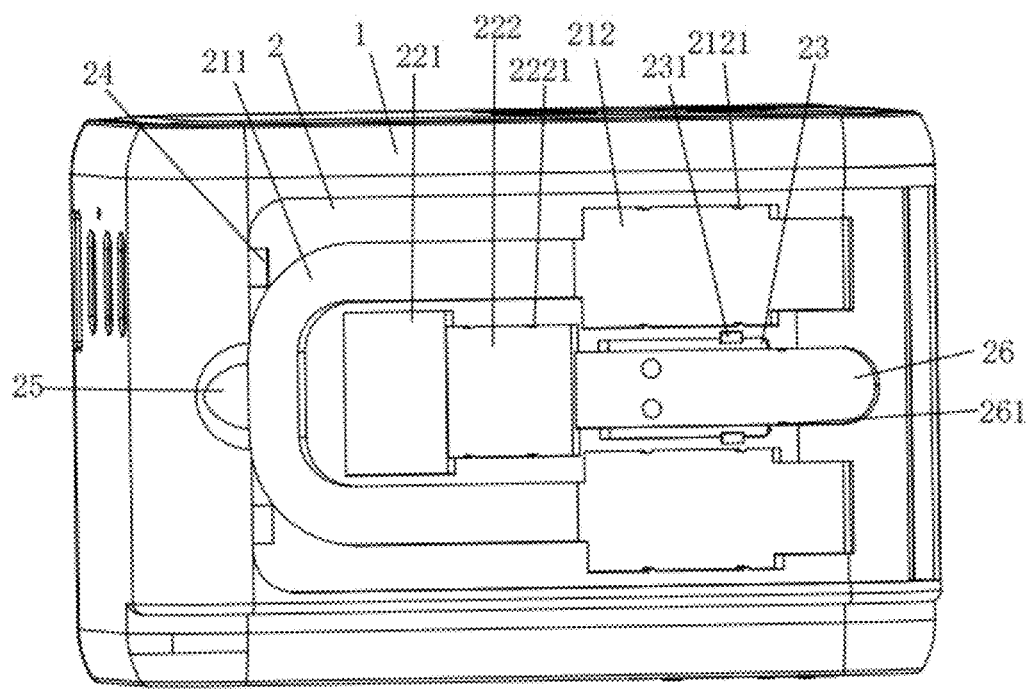
FIG. 10 is a schematic structural view of the power changer with thimbles installed in the placing groove.

The telephone card thimble can also be accommodated in the accommodating groove, as shown in FIGS. 9 and 10. Specifically, a thimble accommodating groove 26 for accommodating the telephone card thimble 44 is formed in the accommodating groove 2. At least a thimble fixing blocks 261 protruding toward the inside of the thimble insertion groove 26 are symmetrically arranged on the side edges of the thimble insertion groove 26. The telephone card thimble 44 is correspondingly placed in the thimble insertion groove 26, and is pressed upward by the thimble fixing block 261, so as to prevent the telephone card thimble 44 from shifting out of the thimble insertion groove 26 and achieve the purpose of accommodating the telephone card thimble 44. When you need to take it, you only need to slide the telephone card thimble 44 out of the thimble insertion slot 26, which is convenient for use. Preferably, in order to save the space on the side of the power converter 1, the thimble insertion slot 26 can be arranged below the phone card insertion slot 23, so that the phone card thimble 44 and the SIM phone card 43 can be overlapped, thus saving the space on the side of the power converter 1. As shown in FIGS. 7 and 8, the depth of the placing groove 2 can be set to be higher than the height of the functional component 4, so that the functional component 4 can be stably installed in the placing groove 2, and the storage of the functional component 4 can be completed without additionally providing an upper cover 3 for covering.

As for the specific way that the upper cover 3 covers the placing groove 2, as shown in FIGS. 2 to 4, at least a cover clamping blocks 32 extending outward are formed on the other end of the upper cover 3. At least a cover engaging grooves 24 for the cover engaging blocks 32 to engage are formed on the side of the placing groove 2. When it is necessary to cover the upper cover 3 on the placing groove 2, it is only necessary to rotate the upper cover 3 to the placing groove 2. The cover clamping block 32 is correspondingly clamped into the cover clamping groove 24, so that the purpose of stably covering the upper cover 3 on the placing groove 2 and preventing the functional accessories in the placing groove 2 from falling off can be achieved, and the storage of the functional components 4 can be realized.

In order to more accurately clamp the cover clamping block 32 into the cover clamping groove 24, as shown in FIGS. 2 and 4, The outermost end of the cover clamping block 32 is formed with an I-guide inclined surface 321 inclined from the inner bottom to the outer top. When the upper cover 3 is covered in the placing groove 2, The guide inclined surface 321 first contacts the cover clamping groove 24, and the cover clamping block 32 is guided by the guide inclined surface 321, More accurately enter the cover clamping groove 24, thereby improving the clamping efficiency of the cover clamping block 32, and further improving the storage efficiency of the storage structure.

In order to facilitate people to open the upper cover 3 from the placing groove 2, as shown in FIGS. 1 to 4, an I-opening yielding groove 25 is formed on the side of the placing groove 2 close to the cover clamping groove 24. By arranging the opening yielding groove 25, a tilted position is reserved between the upper cover 3 and the placing groove 2. People can lift the upper cover 3 from the placing groove 2 and take the functional components 4 in the placing groove 2 by pressing against the opening yielding groove 25 with their hands or other articles.

What needs to be explained here is that the multifunctional accessory storage structure for the power converter disclosed by the invention is an improvement on the specific structure, but it is not an innovation of the invention for the specific control mode. The data line, data adapter, SIM phone card slot, phone card thimble and other parts involved in the invention can be common standard parts or parts known to those skilled in the art, and their structures, principles and control methods are known to those skilled in the art through technical manuals or conventional experimental methods.

The above is only a preferred embodiment of the present invention, and does not limit the technical scope of the present invention, so other structures obtained by adopting the same or similar technical features as the above embodiment of the present invention are within the protection scope of the present invention.

What is claimed is:

1. A multifunctional accessory storage structure for a power converter, comprising
    a placing groove formed on a side of the power converter and
    a functional component,
    wherein the functional component comprises any one or a combination of the following: a data line, a data adapter, a SIM phone card, a phone card thimble;
    wherein the data line comprises an I-wire body and a connector respectively connected to two ends of the wire body; an I-data line placing groove with a U-shape as a whole for placing the data line is formed in the placing groove, and the data line placing groove comprises an I-line body placing groove with a U-shape as a whole for placing a line body, and joint insertion grooves respectively arranged at two ends of the line body placing groove for placing a connector; at least one I-joint clamping lug protruding into the joint insertion groove is formed on a side edge of the joint insertion groove.

2. The multifunctional accessory storage structure for a power converter according to claim 1, further comprising an upper cover, one end of which is clamped with a side edge of the power converter and can be covered on the placing groove; the functional component is installed between the placing groove and the upper cover.

3. The multifunctional accessory storage structure for a power converter according to claim 1, wherein a thimble placing groove for placing the thimble of the telephone card is formed in the placing groove, and at least a thimble fixing blocks protruding towards the inside of the thimble placing groove are symmetrically arranged on side edges of the thimble placing groove.

4. The multifunctional accessory storage structure for a power converter according to claim 2, wherein at least a cover clamping blocks extending outward are formed on the other end of the upper cover, and at least a cover clamping grooves for clamping the cover clamping blocks are formed on the side of the placing grooves.

5. A multifunctional accessory storage structure for a power converter, comprising
    a placing groove formed on a side of the power converter and
    a functional component,
    wherein the functional component comprises any one or a combination of the following: a data line, a data adapter, a SIM phone card, a phone card thimble;
    wherein a adapter insertion slot for inserting the data adapter is formed in the placing groove, and at least one adapter clamping lug protruding into the adapter insertion slot is formed on a side of the adapter insertion slot.

6. A multifunctional accessory storage structure for a power converter, comprising
    a placing groove formed on a side of the power converter and
    a functional component,
    wherein the functional component comprises any one or a combination of the following: a data line, a data adapter, a SIM phone card, a phone card thimble;
    wherein a phone card placing slot for placing the SIM phone card is formed in the placing groove, and at least a phone card fixing blocks protruding into the phone card placing slot are symmetrically formed on side edges of the phone card placing slot.

* * * * *